(12) United States Patent
Kucmerowski et al.

(10) Patent No.: US 7,450,572 B2
(45) Date of Patent: Nov. 11, 2008

(54) INTELLIGENT TERMINAL SIP ENABLED DEVICES

(75) Inventors: Dennis L. Kucmerowski, Delray Beach, FL (US); David A. VanderMeiden, Boca Raton, FL (US)

(73) Assignee: Siemens Communications, Inc., Boca Raton, FL (US)

( * ) Notice: Subject to any disclaimer, the term of this patent is extended or adjusted under 35 U.S.C. 154(b) by 234 days.

(21) Appl. No.: 11/120,225

(22) Filed: May 2, 2005

(65) Prior Publication Data

US 2006/0245418 A1    Nov. 2, 2006

(51) Int. Cl.
    H04L 12/66    (2006.01)
(52) U.S. Cl. .................. 370/352; 370/354; 370/355; 370/356; 370/401; 709/227; 709/244
(58) Field of Classification Search ................. 370/352, 370/354, 355, 356, 401; 709/227, 244
    See application file for complete search history.

(56) References Cited

U.S. PATENT DOCUMENTS

| | | | |
|---|---|---|---|
| 6,795,430 B1* | 9/2004 | Ong et al. .................. 370/352 |
| 6,845,092 B2* | 1/2005 | Vassilovski et al. ......... 370/342 |
| 7,092,385 B2* | 8/2006 | Gallant et al. ............... 370/352 |
| 7,142,537 B2* | 11/2006 | Shores et al. ............... 370/389 |
| 2002/0141404 A1* | 10/2002 | Wengrovitz ................ 370/389 |
| 2003/0023730 A1* | 1/2003 | Wengrovitz et al. ......... 709/227 |
| 2005/0157731 A1* | 7/2005 | Peters ........................ 370/401 |
| 2005/0188110 A1* | 8/2005 | Hollatz ...................... 709/244 |
| 2005/0238162 A1* | 10/2005 | Dezonno .............. 379/265.09 |

* cited by examiner

Primary Examiner—Sanh D Phu

(57) ABSTRACT

The invention facilitates SIP Enabled devices creating and exchanging augmented data communication messages. An initiating SIP Enabled device may be configured to create an augmented message that includes a call-type and/or a network identification. The augmented data may be configured for a SIP Enabled device by either an administrator or a system user. Furthermore, the system user may customize the default settings either indefinitely or temporarily. Upon receiving an augmented SIP communication request, a receiving SIP Enabled device may identify the request as augmented and subsequently extract the augmented data. The receiving SIP enabled device may be configured to execute functionality based on the extracted augmented data. For example, if the augmented data includes a "hotline" call-type, the receiving SIP enabled device may be configured to play a certain ringtone or display a "hotline" identifier on the device's display.

26 Claims, 7 Drawing Sheets

INTELLIGENT TERMINAL SIP ENABLED DEVICES

FIELD OF INVENTION

This invention relates generally to the field of telecommunication data management and more specifically to an apparatus, method and system for providing Session Initiation Protocol (SIP) functionality on a SIP enabled endpoint.

BACKGROUND INFORMATION

Generally, voice data transportation over computer networks has been conducted via 'dumb'—terminals connected with 'intelligent' data servers. The 'dumb' terminals were designated, as such, because the majority of the data processing occurred at a central server location. Voice data would be encoded at the individual terminals, or in later implementations of communication networks—SIP endpoints, and transported to a communication server, where the data could be processed and transmitted to a receiving endpoint in a format conforming to the receiving endpoint's processing requirements.

However, as processors continue to increase in processing power and decrease in cost, it was determined that the data processing could be shifted from the central server to the endpoints, themselves. In order to achieve the data processing shift to the endpoints, significant modifications to the hardware/software components were necessary, in addition to modifying the communication protocols, themselves. According to the functionality shift to the endpoints, the communication server simply acts as a "middle-man" relaying the encoded data from an initiating endpoint to a receiving endpoint. This results in a paradigm shift, wherein telecommunication functionally is provided primarily by the terminal endpoints.

The shift has led to the development of communication protocols that facilitate the data encoding/decoding by the endpoint and simple transfers of the encoded data across a communication network. Session Initiation Protocol (SIP) is one of several protocols that may be used in the Internet Protocol to support Internet Telephony applications. The SIP specification is defined in the Internet Engineering Task Force (IETF) Request for Comments (RFC) 3261, dated June 2002; the disclosure of which is incorporated herein by reference in its entirety. SIP is an application-layer control protocol for creating, modifying, and terminating sessions between networked endpoints, which are referred to as SIP Enabled Devices, User Agents, or simply, SIP endpoints.

As discussed above, SIP Enabled Devices implement a network communication protocol, wherein a communication session is established for two endpoints to exchange communication data. The SIP specification defines several types of communication resources implemented for establishing and maintaining SIP based communication sessions among SIP Enabled Devices, which include SIP Registrars, SIP Redirect Servers, and SIP Proxies. These SIP communication resources are responsible for sending, receiving, routing, and relaying SIP messages among SIP Enabled Devices.

SIP Proxy Servers conventionally perform a variety of functions in SIP networks, such as coordinating data routing for SIP session requests to a particular SIP network subscriber current location; authenticating and authorizing SIP network users for particular services; implementing call-routing policies, as well as providing additional functionality to SIP network users. However, as discussed above, the paradigm is shifting to provide functionality at the SIP endpoints. The invention discussed herein is directed to achieving the paradigm shift.

SUMMARY OF THE INVENTION

An object of the invention is to modify SIP Enabled devices to create augmented SIP communication messages that include call type and/or network identification parameters. As such, an initiating SIP Enabled device is capable of creating augmented SIP communication request messages. A receiving SIP Enabled device may identify data within an incoming communication request as correlating to a certain call type and/or network identification parameter according to a standardized format.

Accordingly, a SIP Enabled device receiving such an augmented communication message can process the incoming communication request and determine what type of call it is and/or what type of network the call originated from. The receiving SIP Enabled device may also be configured to execute a range of operations/functionality based on the processed augmented communication data. As will be discussed in greater detail below, the receiving SIP Enabled device may implement a special ring tone or flash a special indicator based on the call type/network identification parameter.

It is an object of the invention to provide the additional functionality in a variety of implementations that provide users a great deal of flexibility. In one implementation, system administrators may have the ability to establish the call type/network identification parameters available for either an individual SIP endpoint of a series or SIP endpoints. Further, the administrator may provide a system user (subscriber) with a limited ability to further customize the settings for their needs. In another implementation, the administrator may allow the system user to fully customize the SIP Enabled device to meet the communication needs on an individual call basis.

It is another object of the invention to provide SIP Enabled devices/servers that may be configured to operate according to the conventional SIP communication protocol or the modified SIP communication protocol. More specifically, the SIP enabled device may generate either conventional SIP data messages or augmented SIP data messages that include call type/network identification parameters depending on the particular operating environment.

DETAILED DESCRIPTION OF THE INVENTION

In the following description of the various embodiments of the invention, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Overview

Figure 1:
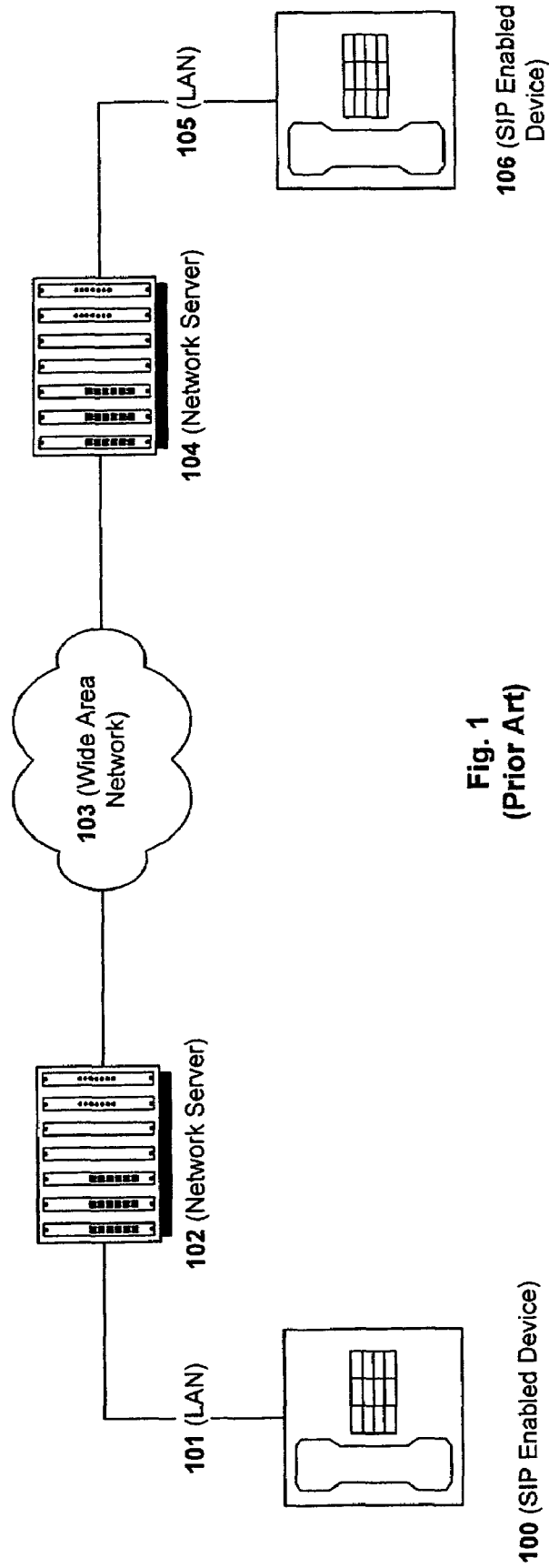
FIG. 1 illustrates a block diagram of SIP elements implemented as a conventional SIP Enabled device communication network.

FIG. 1 illustrates a conventional SIP Enabled device communication network. SIP Enabled devices 100, 106 are hardware devices implementing a SIP Enabled Application module (software configured to enable the SIP communication protocol). The SIP Enabled devices 100, 106 conduct communication sessions through any type of networked devices, such as: network servers 102, 104, across Local Area Networks (LANs) 101, 105 or Wide Area Networks (WANs) 103. For illustrative simplicity, network servers 102 and 104 each perform the function of a SIP Proxy Server, a SIP Redirect Server, and a SIP Registrar; the functionality of which are defined in the herein before referenced SIP protocol specification. These network servers also provide some functionality that is required for the SIP Enabled Devices to communicate; for example a Domain Name System (DNS) server, a Dynamic Host Control Protocol (DHCP) server, and a Lightweight Directory Access Protocol (LDAP) server.

The communication sessions are conducted based on the SIP Internet Telephony communication protocol. More specifically, the communications sessions are established and conducted through the transmission, processing and receipt of SIP communication data messages among SIP Enabled devices. Examples of SIP Enabled Devices include telephones, personal computers, and multimedia conferencing systems or any other type of device capable of implementing the SIP communication protocol.

In accordance with the invention, SIP Enabled devices are configured with a range of communication functionality performed upon the initiation or receipt of an augmented communication request. By way of example only, an initiating SIP enabled device may designate a communication request as a "hotline" call or any other number of call type designations. Illustrative call types include, but are not limited to: an A-B call, a hotline call, a warmline call, a hunting call, a manual hold call, callback, a call forwarded call, etc.

Furthermore, under the present invention, the initiating SIP Enabled device may also associate a designated network identification type with an augmented communication request. Example network identification parameters may include internal/private, external/public or unknown. It is to be understood that this is not an exhaustive list of call types/network identification parameters and that additional call types/network identifiers may be developed. Further, as will be described in greater detail below, the administrators/system users may automatically or manually associate the call-type/network identification designations associated with communication requests executed by an individual terminal or by any number of terminals.

Figure 2:
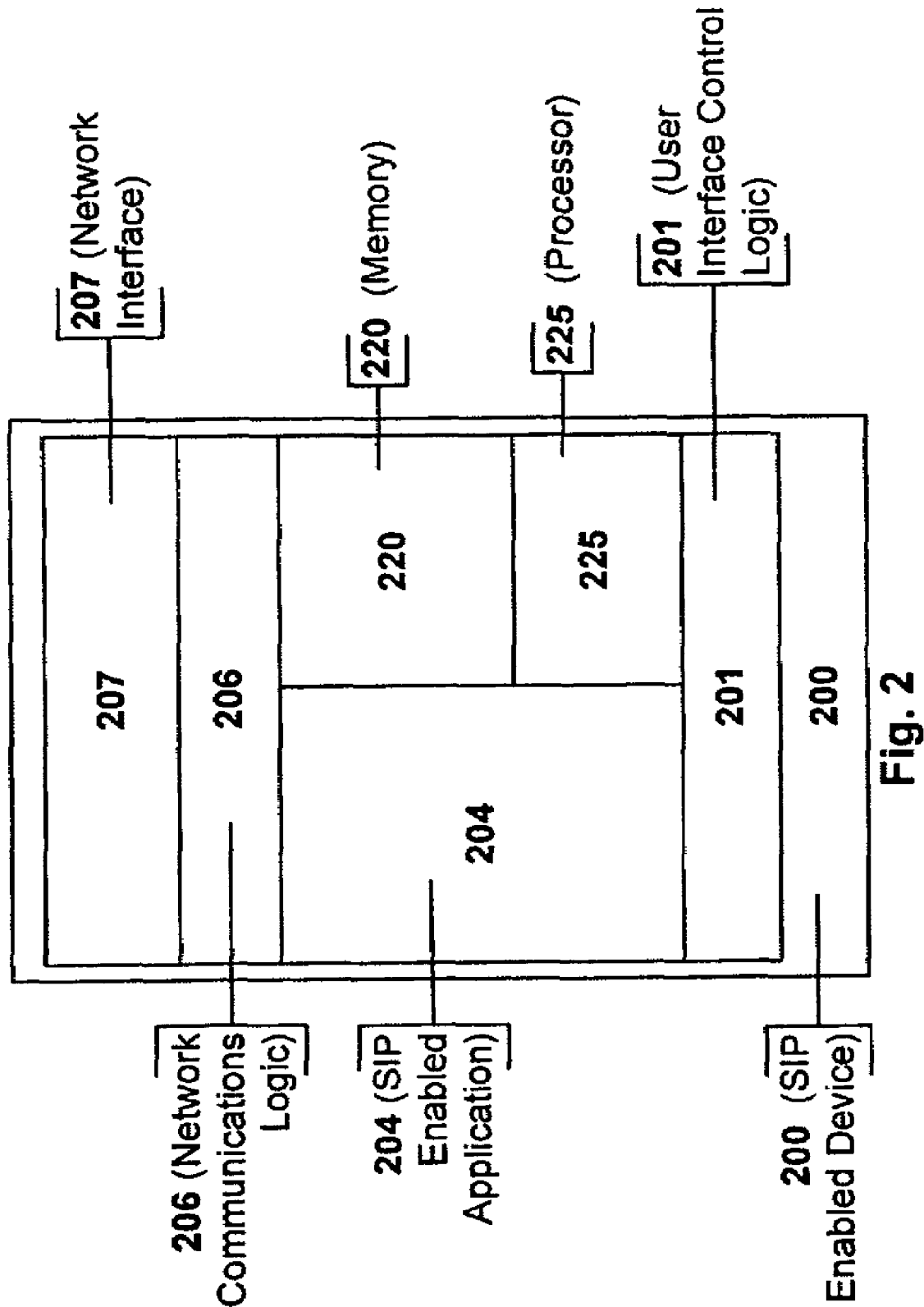
FIG. 2 illustrates a diagram of software modules/hardware components within a SIP Enabled device according to the present invention.

Referring to FIG. 2, a SIP Enabled Device 200 is comprised of a User Interface Control Logic module 201 that interfaces with a user interface (an illustrative user interface is shown in FIG. 2 and discussed below). The User Interface Control Logic module 201 also interfaces with a SIP Enabled Application 204. The SIP Enabled Application 204 implements a controller coordinating the various modules interacting within a single SIP Enabled Device 200 for creating, sending, receiving and processing SIP data messages (as discussed in greater detail below).

The SIP Enabled Application 204 is also responsible for controlling additional functionality associated with the SIP Enabled device 200. The SIP Enabled Application module 204 and the Network Communication Logic module 206 are stored on the SIP enabled device 200 in memory 220 and executed by processor 225. The SIP Enabled Application 204 interfaces with Network Communications Logic module 206 to send and receive non-SIP messages with other networked resources (not shown). Network Communications Logic module 206 interfaces with Network (hardware) Interface 207, which is used to physically interface to a network (an exemplary network is shown in FIG. 1) that provides connectivity with other networked devices.

Figure 3:
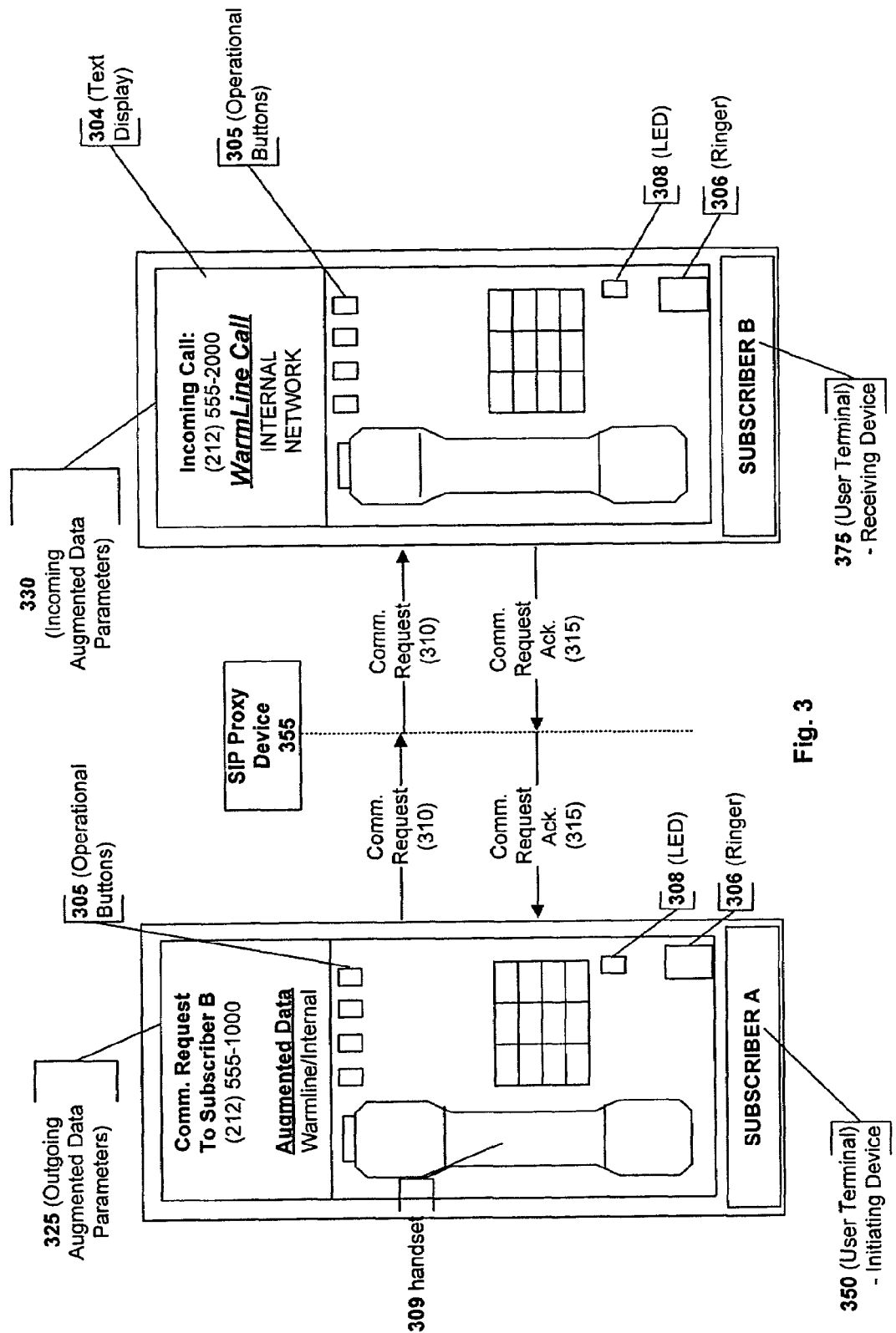
FIG. 3 illustrates a representative network of SIP Enabled devices, illustrating an initiating SIP Enabled device and a receiving SIP Enabled device connected across a SIP device communication network according to the present invention.

FIG. 3 illustrates one embodiment of the present invention where an initiating SIP Enabled device 350 communicates with a receiving SIP Enabled device 375 across a SIP proxy device 355 (representing one possible implementation of a communication network device). It is to be understood that the SIP Enabled devices 350 and 375 are possible implementations of the software modules/hardware components illustrated in FIG. 2 and discussed above. The user interfaces illustrated in FIG. 3 are example interfaces associated with SIP Enabled devices used for Internet telephony applications. The user interfaces are comprised of components including: a handset 309, text display 304, operational buttons 305, as well as ringer 306 and an LED indicator 308. A user physically interacts with these components to operate the SIP Enabled Device 350, 375 in a manner that is similar to a telephone.

In accordance with the invention, the SIP Enabled devices 350 and 375 are configured to implement an augmented version of the SIP communication protocol. Initiating/Receiving SIP Enabled devices 350, 375 provide additional functionality than that possible with a conventional telephone. More specifically, the enhanced SIP Enabled devices 350 and 375 may be configured, for example, to include call-type and/or network identification parameters as part of the SIP data communication messages.

FIG. 3 also depicts a representative message exchange between a transmitting and a receiving SIP Enabled device. The figure illustrates an initiating SIP terminal implementing call type/network identification parameters within a SIP communication request (augmented SIP data message) and transmitting the augmented SIP data message to a receiving SIP terminal. The initiating SIP Enabled Application 204 (see FIG. 2) in device 350 may be configured to augment a SIP "invite" message or "re-invite" message to include additional data corresponding to the call type/network identification parameters associated with a particular communication request.

For example, in one implementation, the communications processor is configured to identify whether an initiating/receiving device is connected to a network that supports the supplemental functionality. If the SIP Enabled device is configured to support the supplemental functionality, the augmented data messages are created/processed. In the event that an initiating device does not support the supplemental functionality, ordinary SIP communication data messages are sent. Further, if the receiving device does not support the supplemental functionality, the augmented data parameters would not be processed and simply ignored.

In one implementation, the SIP Enabled Application 204 in initiating device 350 may append augmented data to the "invite" or "re-invite" communication initiation messages. Alternately, the SIP Enabled device 350 may be configured to create augmented SIP communication initiation messages that include data bits set aside for the call type/network identification parameters.

Figure 4:
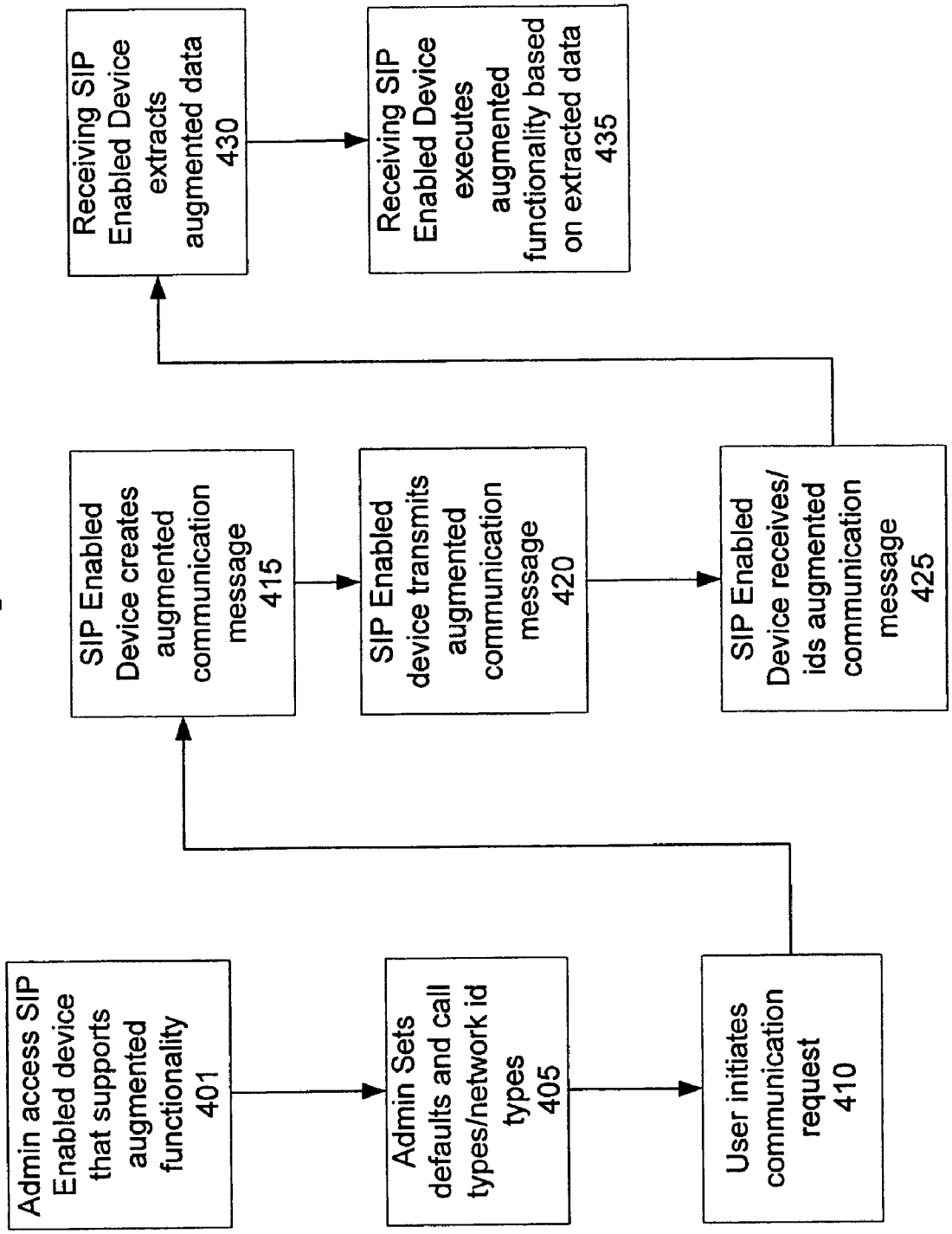
FIG. 4 illustrates a flow diagram associated with an administration process for creating and transmitting augmented SIP data communication messages under the present invention.
Figure 5:
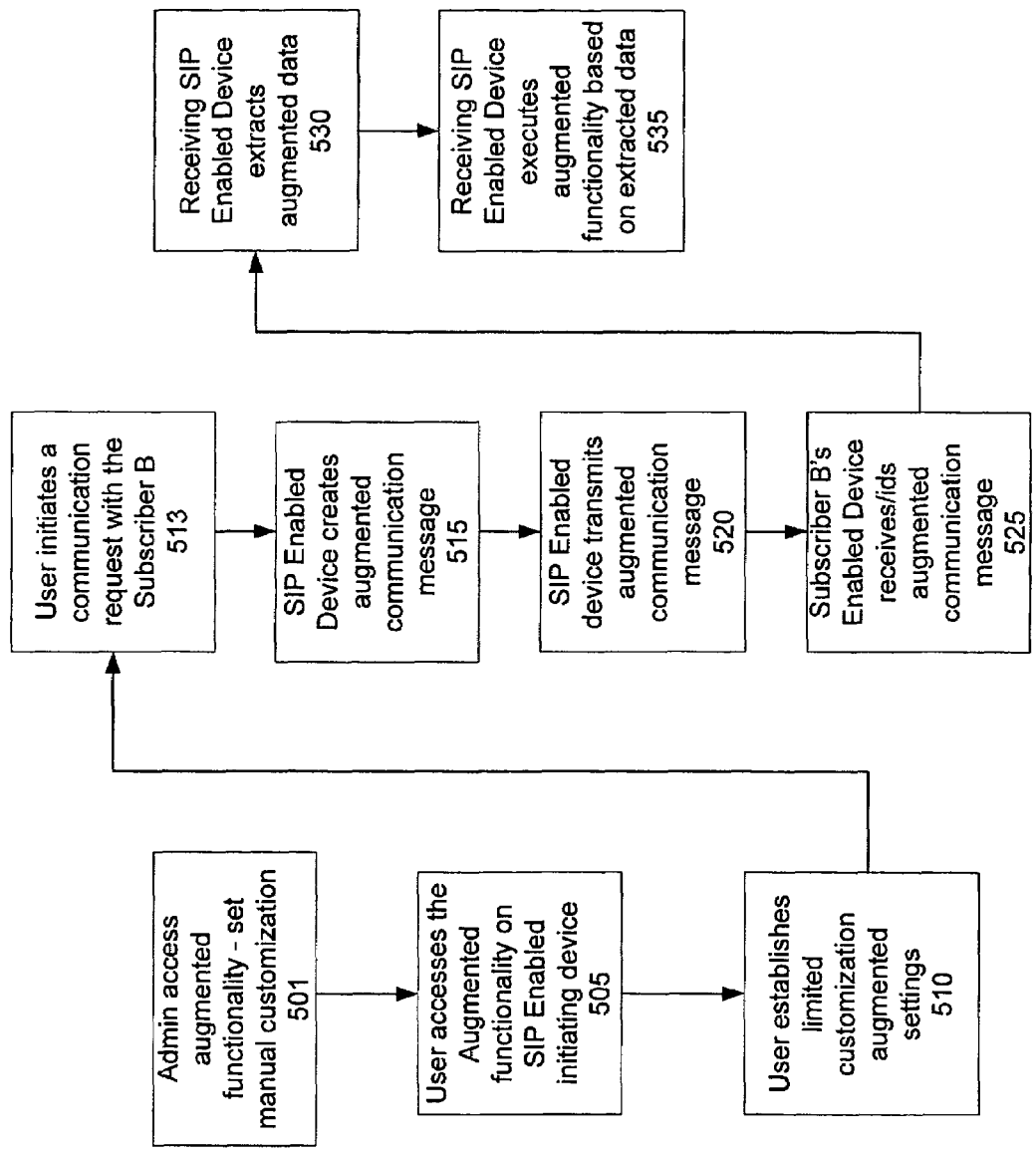
FIG. 5 illustrates a flow diagram associated with an administration process for establishing a limited range of user customization associated with creating and transmitting augmented SIP data communication messages under the present invention.
Figure 6:
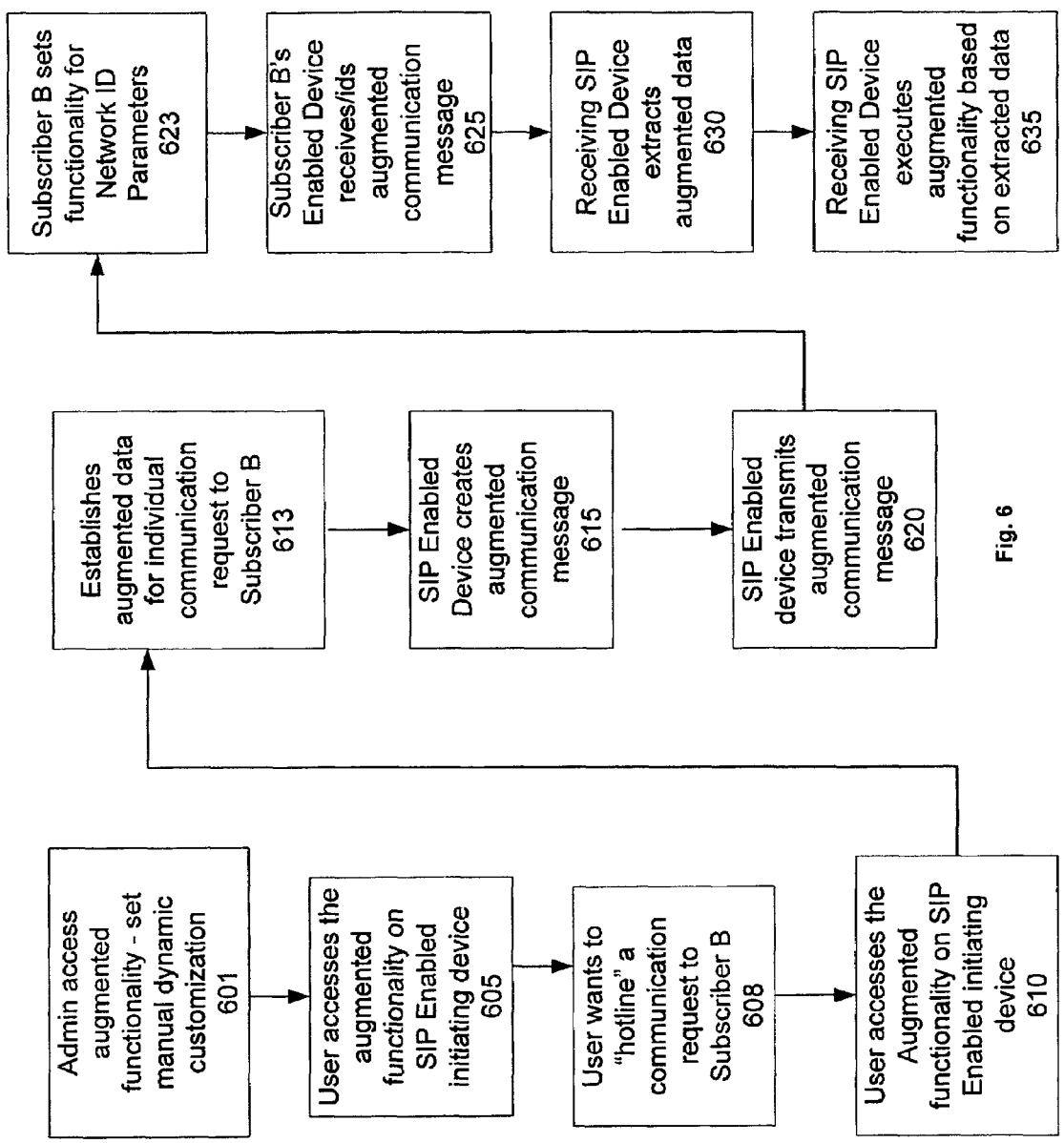
FIG. 6 illustrates a flow diagram associated with an administration process for establishing a full range of user customization associated with creating and transmitting augmented SIP data communication messages under the present invention.

As discussed above, the initiating SIP Enabled device 350 may be configured to automatically switch into an augmented functionality operational mode. FIGS. 4, 5 and 6 illustrate flow diagrams depicting three illustrative implementations of the communication session request process. The flow diagrams illustrate the procedures that are executed by the components shown in FIG. 3.

FIG. 4 illustrates an implementation of the system where a system administrator accesses SIP Enabled device 350, which is configured to support augmented SIP functionality. In step 401, the system administrator logs into the SIP Enabled device 350 (either locally or remotely). According to this implementation, the administrator sets the defaults call types/network identification types for the device communication sessions.

For illustrative purposes, these steps will be discussed in the context of setting up an office telephone system. As such, the administrator has the ability to set default call-types to associate with various phone calls, such as calls originating within a specific office, from a satellite office, or from outside the company. For example, an administrator may set the default inter-office call-type as a standard A-B call type (a first user is simply calling a second user). After establishing a default call type, the administrator may then associate certain phone numbers with a different call type. For example, the administrator in step 405 may associate all phone numbers for subscribers within a defined workgroup as "Project A" or "warmline" calls.

Further, at this point the administrator also establishes the default network identification for the SIP Enabled device, assigning a Network_ID value that will be included as part of the SIP communication request messages. It is to be understood that an administrator may provide an identifier for a particular network of SIP communication devices. The identifier may be correlated to Network_ID values including general Network_ID values such as an interior network, exterior network and/or unknown network identifiers. Alternately or in addition to, an administrator may provide a Network_ID with a certain level of specificity, for example such to indicate a remote office network (e.g., Detroit Office) and/or a corporate network id (e.g., Siemens) and to enable a receiving unit to identify a particular initiating network. After the system administrator has finished configuring the SIP Enabled device 350 (see, FIG. 3), a user may initiate a communication request. In step 410, the user (Subscriber A 350) initiates a communication request to another user (Subscriber B 375). For the purposes of this discussion, it is assumed that Subscriber B is within a work group that has been designated as a "warmline" call-type.

Accordingly, the initiating SIP Enabled device 350 creates an augmented communication message in step 415. In one implementation, the initiating SIP Enabled device augments the SIP "invite" or the "re-invite" data message to include the call type/network identification parameters. The initiating SIP Enabled device 350 then transmits the augmented SIP communication message in step 420 to the receiving SIP Enabled device 375. After receiving the message, the SIP device 375 identifies the message as augmented and containing call type/network identification parameters in step 425. In some implementations, the receiving SIP Enabled device 375 may identify whether the incoming SIP message is augmented or a standard SIP message. The identification step ensures that the correct processing routine will be applied to the data message.

The next step in the communication initiation process involves the receiving SIP device 375 extracting the augmented data in step 430 and implementing defined functionality based on the extracted data in step 435. For example, as shown in FIG. 3, SIP Device 375 displays "WarmLine" on the text display 304 because there was a "warmline" call type associated with the communication request. Moreover, based on locally defined parameters, SIP device 375 may activate the ringer 306 in a manner correlated with "warmline" calls. The actual functionality corresponding to correlated call types is configured on the receiving SIP device 375. For example, SIP Device 375 may be configured to execute three short chirp rings for all "warmline" calls. During data extraction/processing SIP device 375 parses the network identification data and confirms the initiating SIP device 350 is on an internal network. Therefore, as shown in FIG. 3, the text display 304 shows an "Internal Network" indicator on the display.

In another implementation of the invention, the Receiving SIP device 375 may execute additional functionality or features based on a received (and correlated) call type. For example, subscriber A may have an established communication session with subscriber B. Another SIP device associated with subscriber C may request a communication session with subscriber B. Subscriber B's SIP enabled device may process and determine subscriber C's communication request as a "Hotline" line call type and interrupt the established communication session. Alternately, subscriber B's SIP device may be operating in "Do-Not-Disturb" mode. Subscriber A may place a "Hotline" call to subscriber B. Subscriber B's SIP device will process and determine the incoming communication request is a "Hotline" call type and may be configured to override the "Do-Not-Disturb" mode setting of subscriber B's SIP device. It is to be understood that SIP devices may be configured to execute similar functionality based on the Network_ID type or any other type of augmented SIP data parameter.

FIG. 5 is a flow diagram illustrating a similar process of establishing the augmented data parameters on an initiating SIP Enabled device 350 as the process illustrated in FIG. 4. However, in step 501 of the implementation in FIG. 5, Subscriber A is provided with limited customization capabilities. The administrator configures the basic defaults associated with SIP Enabled device 350, such as setting default A-B call types and the network identification parameter in step 501.

The administrator also provides a limited set of user customization, for example, enabling the user to customize the call types for communication requests to subscribers within a specific workgroup. In step 505, a user (Subscriber A) is able to access a customization menu on text display 304 through interacting with the operational buttons 305. In step 510, the user can designate communication requests directed to Subscriber B as a "warmline" call type. Additionally, Subscriber A may customize how SIP Enabled device 350 responds to incoming communication requests with various call types (i.e., what type of indicator is displayed or what type of ringtone is generated).

As discussed, Subscriber A is provided with a limited customization ability. Once these parameters have been established in step 510, Subscriber A initiates a communication request directed to Subscriber B 375 in step 513. In accordance with the customized augmented data parameters, SIP Enabled device 350 creates an augmented communication request message in step 515 and transmits the augmented request message in step 520. In steps 525 and 530 respectively, the receiving SIP Enabled device 375 receives, identifies and processes the augmented communication request message.

FIG. 6 illustrates a flow diagram associated with an implementation where the user may temporarily customize call-types. In step 601, an administrator configures the basic default augmented information associated with SIP Enabled device 350. As discussed regarding FIG. 5, Subscriber A is provided with the ability to further customize the initial administrator settings in step 605.

However, Subscriber A may want to temporarily associate Subscriber B with a different call type. For example, Subscriber A may have to make an urgent call to Subscriber B. Advantageously, Subscriber A can make a single "hotline" communication request to Subscriber B in step 608. Alternately, Subscriber A may temporarily modify the call type for a certain number of calls or a certain time period. This may be considered "one-shot" functionality, however it is to be understood that the actual number of communication requests with a modified call type association may vary between different implementations of the invention.

Accordingly, Subscriber A may press an operational button 305 (see, FIG. 3) to accomplish the temporary transition in call type in step 610. For example, pressing one of the operational buttons 305 may access a call type transition menu on text display 304, while pressing another button 305 may effectuate the new temporary association in step 613.

Figure 7:
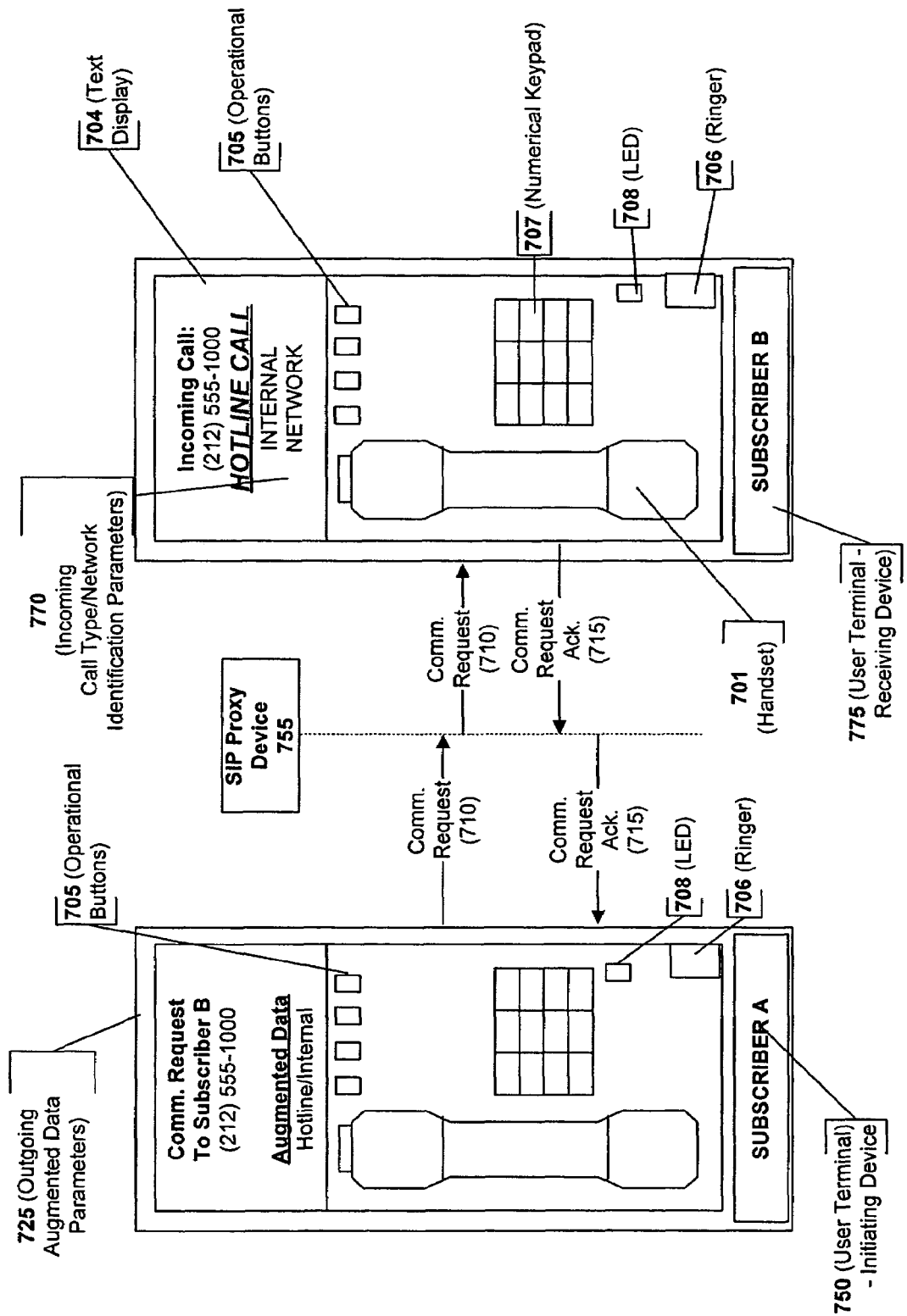
FIG. 7 illustrates a receiving SIP Enabled Device configured to receive augmented SIP communication data messages according to the present invention.

After the temporary call-type/communication request is made, the SIP Enabled device 350 creates and transmits the augmented communication request in steps 615 and 620, respectively. In steps 625 and 630, SIP Enabled device 375 receives, identifies and processes the augmented communication request. The functionality associated with the temporary call-type is executed in step 635 and illustrated in FIG. 7. By way of example only, the "hotline" call-type correlates to functionality that includes displaying the term "HOTLINE CALL" 770, flashing the LED indicator 708 and/or playing a distinct ringtone on ringer 706 on subscriber B's SIP device 775.

Furthermore, SIP proxy device 755 may be configured to identify the communication request transmitted from Subscriber A's device 750 to Subscriber B's device 750 as an internal/private network communication request. Accordingly, as part of the communication process the "middle man," SIP proxy device 755, may set the Network_ID parameter to indicate that the communication request is transmitted on an internal network. This data may be added to the augmented message as the message is transmitted to Subscriber B's device 775. As illustrated in step 623, subscriber B may configure the SIP Enabled device 375 with a particular text indicator 770 or a specific ring cadence to indicate that the incoming communication request is from a SIP Enabled device 750 that is part of the "internal network" (as illustrated on text display 704 in FIG. 7).

As another example of Network_ID based functionality, SIP Enabled device 775 may initiate a single long ringing cadence for Internal/private network calls or a double short ringing cadence for external/public network calls based on the particular Network_ID parameter. In another implementation, SIP Enabled device 775 may be configured to identify the Network_ID and forward all internal network calls to a voicemail, whereas external calls are forwarded to a secretary or communication system operator.

The present invention has been illustrated and described with reference to particular embodiments and applications thereof. It will be readily apparent to those skilled in that art that the present invention will have applications beyond those described herein for purposes of description of the invention. For example, the present invention can be adapted for use in any environment where the principals taught herein are desired.

To facilitate discussion of the present invention, preferred illustrative embodiments are assumed; however, the above-described embodiments are merely illustrative of the principals of the invention and are not intended to be exclusive embodiments thereof. It should be understood by one skilled in the art that alternative embodiments drawn to variations in the enumerated embodiments and teachings disclosed herein can be derived and implemented to realize the various benefits of the present invention.

It should further be understood that the foregoing and many various modifications, omissions and additions may be devised by one skilled in the art without departing from the spirit and scope of the invention. It is therefore intended that the present invention is not limited to the disclosed embodiments but should be defined in accordance with the claims which follow.

We claim:

1. A method for initiating communication from a first SIP Enabled device comprising:
   initiating a SIP communication request;
   creating a SIP data message, wherein a standard data packet is augmented with a portion configured to define a call type variable;
   correlating a call type with the communication request;
   storing data in the augmented portion of the SIP data message defining the correlated call type; and
   transmitting the augmented SIP data message to a second SIP Enabled device.

2. The method of claim 1, wherein the augmented SIP data message is further configured to define a network identification variable;
   a network identification type is defined in the communication request; and
   storing data in the augmented portion of the SIP data message defining the network identification type.

3. The method of claim 1, wherein the augmented SIP data message is an invite or re-invite message.

4. The method of claim 1, wherein the transmitted said augmented SIP data message is further augmented by a SIP proxy device and forwarded to said second SIP Enabled device.

5. The method of claim 2, wherein default values are established for the call type by an administrator.

6. The method of claim 2, further comprising enabling a system user to further customize the call type and parameters.

7. The method of claim 2, wherein call type parameters are customized for a particular set of SIP devices.

8. The method of claim 2, wherein the Network_ID parameters are configured for a SIP enabled network through a network administrative process.

9. The method of claim 2, wherein the augmented SIP data message is a re-invite message.

10. The method of claim 6, wherein the system user temporarily modifies the call type parameter for a number of communication requests.

11. A method of processing augmented SIP data messages comprising:
- receiving at a SIP endpoint an augmented SIP data message augmented with data corresponding to call type/network identification parameters;
- extracting data stored in an augmented portion of the augmented SIP data message;
- correlating the extracted data to a call type;
- generating an indicating function at a receiving SIP enabled device based on the correlated call type;
- extracting said data stored in the augmented portion of the augmented SIP data message;
- correlating the extracted data to a network identification type; and
- generating an indicating function at the receiving SIP enabled device.

12. The method of claim 11, wherein the SIP enabled device generates a specific ringtone based on the extracted call type.

13. The method of claim 11, wherein the SIP enabled device interrupts a current communication session, based on the extracted call type parameter.

14. The method of claim 11, wherein the SIP enabled device displays a call type identifier, or associated text/information on a display.

15. The method of claim 11, wherein the SIP enabled device displays a network identifier or associated text/information on a display.

16. The method of claim 11, wherein the SIP enabled device generates a specific ringtone based on the network identification type.

17. The method of claim 11, wherein the SIP enabled device redirects the communication request to another SIP Enabled device based on the network identification type.

18. The method of claim 11, wherein the call type/network identification parameters include characterizing the corresponding call as one of an A-B call, a hotline call, a warmline call, a hunting call, a manual hold call, callback, and a call forwarded call.

19. The method of claim 11, wherein the call type/network identification parameters include characterizing the corresponding network as one of internal/private, external/public and unknown.

20. A method for initiating communication from a first SIP Enabled device comprising:
- initiating a SIP communication request;
- creating a SIP data message, wherein a standard data packet is augmented with a portion configured to define a Network_ID variable;
- correlating a Network_ID with the communication request;
- storing data in the augmented portion of the SIP data message defining the correlated Network_ID; and
- transmitting the augmented SIP data message to a second SIP Enabled device.

21. The method of claim 20, wherein the augmented SIP data message is configured to define a call type variable;
- correlating a call type is defined in the communication request; and
- storing data in the augmented portion of the SIP data message defining the call type.

22. A method of processing augmented SIP data messages comprising:
- receiving an augmented SIP data message;
- extracting data stored in an augmented portion of the SIP data message;
- correlating the extracted data to a Network_ID;
- generating an indicating function at a receiving SIP enabled device based on the correlated Network_ID;
- extracting data stored in the augmented portion of the SIP data message;
- correlating the extracted data to a call type; and
- generating an indicating function at the receiving SIP enabled device based on the correlated call type.

23. A method for initiating communication from a first SIP Enabled device comprising:
- initiating a SIP communication request;
- creating a SIP data message, wherein a standard data packet is augmented with a portion configured to define a call type variable and further define a network identification variable,
  - a network identification type is defined in the communication request; and
  - storing data in the augmented portion of the SIP data message defining the network identification type;
- correlating a call type with the communication request;
- storing data in the augmented portion of the SIP data message defining the correlated call type;
- transmitting the augmented SIP data message to a second SIP Enabled device; and
- enabling a system user to further customize the call type and parameters, wherein the system user temporarily modifies the call type parameter for a specific duration of time.

24. A method for initiating communication from a first SIP Enabled device comprising:
- initiating a SIP communication request;
- creating a SIP data message, wherein a standard data packet is augmented with a portion configured to define a call type variable and further define a network identification variable,
  - a network identification type is defined in the communication request; and
  - storing data in the augmented portion of the SIP data message defining the network identification type;
- correlating a call type with the communication request;
- storing data in the augmented portion of the SIP data message defining the correlated call type; and
- transmitting the augmented SIP data message to a second SIP Enabled device, wherein augmented parameters are included within an augmented data message to override a receiving device's operational parameters.

25. A method of processing augmented SIP data messages comprising:
- receiving an augmented SIP data message;
- extracting data stored in an augmented portion of the SIP data message;
- correlating the extracted data to a call type;
- generating an indicating function at a receiving SIP enabled device based on the correlated call type;
- extracting data stored in the augmented portion of the SIP data message;
- correlating the extracted data to a network identification type; and
- generating an indicating function at the receiving SIP enabled device, wherein the SIP enabled device provides access to the receiving SIP Enabled Device's voicemail based on the network identification type.

26. A method of processing augmented SIP data messages comprising:
- receiving an augmented SIP data message;
- extracting data stored in an augmented portion of the SIP data message;
- correlating the extracted data to a call type;

generating an indicating function at a receiving SIP enabled device based on the correlated call type;
extracting data stored in the augmented portion of the SIP data message;
correlating the extracted data to a network identification type; and generating an indicating function at the receiving SIP enabled device, wherein the SIP enabled device overrides a function associated with a receiving SIP Enabled Device, based on the extracted call type parameter.

* * * * *